(12) United States Patent
Binns

(10) Patent No.: US 8,619,560 B1
(45) Date of Patent: *Dec. 31, 2013

(54) INTERMEDIATE NETWORK DEVICE APPLYING APPLICATION-LAYER QUALITY OF SERVICE TO CHANNELS WITHIN A COMMUNICATION SESSION

(71) Applicant: Juniper Networks, Inc., Sunnyvale, CA (US)

(72) Inventor: Roger Binns, Santa Cruz, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,918

(22) Filed: Jan. 7, 2013

Related U.S. Application Data

(63) Continuation of application No. 11/511,016, filed on Aug. 28, 2006, now Pat. No. 8,351,327.

(51) Int. Cl.
*G06F 11/00* (2006.01)

(52) U.S. Cl.
USPC ........................................... 370/229

(58) Field of Classification Search
USPC ...................... 370/229, 230, 230.1
See application file for complete search history.

(56) References Cited

U.S. PATENT DOCUMENTS

| | | | |
|---|---|---|---|
| 5,774,656 A | 6/1998 | Hattori et al. | |
| 6,098,172 A * | 8/2000 | Coss et al. | 726/11 |
| 6,680,976 B1 * | 1/2004 | Chen et al. | 375/240.26 |
| 6,879,561 B1 | 4/2005 | Zhang et al. | |
| 6,944,168 B2 | 9/2005 | Paatela et al. | |
| 7,305,546 B1 | 12/2007 | Miller | |
| 8,351,327 B1 * | 1/2013 | Binns | 370/229 |
| 2002/0095400 A1 | 7/2002 | Johnson et al. | |
| 2002/0194345 A1 * | 12/2002 | Lu et al. | 709/227 |
| 2006/0198376 A1 | 9/2006 | Takamichi | |
| 2006/0242313 A1 * | 10/2006 | Le et al. | 709/230 |
| 2007/0091804 A1 * | 4/2007 | Pan et al. | 370/230 |
| 2007/0156869 A1 | 7/2007 | Galchev et al. | |
| 2008/0025230 A1 | 1/2008 | Patel et al. | |

OTHER PUBLICATIONS

Prosecution history from U.S. Appl. No. 11/511,016, dated Mar. 16, 2009 through Sep. 19, 2012, 271 pp.

* cited by examiner

*Primary Examiner* — Mark Rinehart
*Assistant Examiner* — Mohammad Anwar
(74) *Attorney, Agent, or Firm* — Shumaker & Sieffert, P.A.

(57) ABSTRACT

An intermediate network device intercepts a packet flow associated with a communication session between a client device and a server, splits the intercepted packet flow of the communication session into a plurality of application-layer data channels, wherein each application-layer data channel represents an independent stream of application-layer data within the communication session, performs Quality of Service (QoS) processing on the application-layer data channels, combines the plurality of QoS-processed application-layer data channels into a combined packet flow, and outputs the combined packet flow onto the communication session between the client device and the server.

26 Claims, 5 Drawing Sheets

INTERMEDIATE NETWORK DEVICE APPLYING APPLICATION-LAYER QUALITY OF SERVICE TO CHANNELS WITHIN A COMMUNICATION SESSION

This application is a continuation of U.S. application Ser. No. 11/511,016, filed Aug. 28, 2006, the content of which is hereby incorporated by reference.

TECHNICAL FIELD

The invention relates to data transmission in computer networks and, in particular, to quality of service (QoS) for delivery of communication flows within the computer networks.

BACKGROUND

A typical computer network, such as an internet protocol (IP) network, supports communications between various network devices. When two network devices communicate, the devices establish a communication session using a communication protocol, such as the Transmission Control Protocol (TCP). Devices, such as routers and switches, forward packet flows associated with the communication session through the physical network that connects the devices. Each TCP session, for example, typically includes two packet flows in opposite direction between the devices. Each flow of packets between the devices for a TCP session is commonly referred to as a TCP flow or a TCP stream. The devices may provide quality of service (QoS) to TCP sessions to reduce latency, delay, or jitter in communications between the devices. For example, the devices may assign priority among multiple TCP sessions.

SUMMARY

In general, the invention relates to techniques for providing improved transmission of communication sessions over a network, such as the Internet or a service provider network. In particular, the techniques allow an intermediate (IM) device to intercept and dynamically modify packet flows for a communication session between network devices to perform Quality of Service (QoS) processes at the application layer upon individual "channels" within the communication session. As used herein, the terms "channel" and "data channel" refer to independent streams of application-layer data that are transmitted in a common (i.e., single) communication session, such as a single TCP session. The techniques may allow the IM device to apply QoS processing to packet flows within the context of the individual channels, while still presenting the network devices with a single communication session.

For example, the network devices may use an application protocol such as Microsoft™ Remote Desktop Protocol to exchange data via a communication session for providing remote access to one network device from another network device. In this example, the communication session may be composed of multiple data channels that have been combined into a single communication session. For example, individual channels may contain application-layer data associated with different functions, such as application-layer data associated with display operations and different application-layer data associated with print jobs or file access operations.

An IM device located between the client and server is configured to transparently intercept packets associated with the communication session, dynamically split the communication session into its constituent data channels based on the application-layer data conveyed by the packets, and perform application-layer QoS processing on data channels within each of the data channels. During the process, for example, the IM device may re-order data packets within a single data channel, may reorder data packets within the communication session for one data channel relative to another so as to reorder the sequence in which application-layer operations are communicated, and may re-block the application-layer data into different data packets entirely. The IM device may analyze for dependencies in application-layer data across the channels, and account for these dependencies when applying the QoS processing. The IM device then re-combines the QoS-processed channels into a single outbound packet flow, and injects the outbound packet flow into the communication session towards the network device for which intercepted the packet flow was destined.

In this manner, a communication session containing a plurality of data channels may be intercepted and the contents of the packet flow within the communication session altered to provide application-layer QoS processing on a per-channel basis. The IM device may perform these functions transparently to the network devices. In one example embodiment, the communication session may be a TCP session. The techniques described herein may reduce latency and jitter in the network and enhance user experiences within the network.

In one embodiment, a method comprises intercepting, with an intermediate device, a packet flow associated with a communication session between a client device and a server, and splitting, with the intermediate device, the intercepted packet flow of the communication session into a plurality of application-layer data channels, wherein each application-layer data channel represents an independent stream of application-layer data within the communication session. The method further comprises performing QoS processing on the application-layer data channels within the intermediate device, combining, with the intermediate device, the plurality of QoS-processed application-layer data channels into a combined packet flow, and outputting the combined packet flow from the intermediate device onto the communication session between the client device and the server.

In another embodiment, an intermediate device comprises an interface card for intercepting a packet flow associated with a communication session between a client device and a server, and a demultiplexer for splitting the intercepted packet flow of the communication session into a plurality of application-layer data channels, wherein each application-layer data channel represents an independent stream of application-layer data within the communication session. The intermediate network device further includes a QoS module for performing QoS processing on the application-layer data channels, and a multiplexer for combining the plurality of QoS-processed application-layer data channels into a combined packet flow. The interface card outputs the combined packet flow onto the communication session between the client device and the server.

In another embodiment, a system comprises a wide area network (WAN), and a client device that exchanges network communications with a server across the WAN via a communication session. The system also includes an intermediate network device that intercepts a packet flow associated with the communication session, and splits the intercepted packet flow of the communication session into a plurality of application-layer data channels, wherein each application-layer data channel represents an independent stream of application-layer data within the communication session. The intermediate network device further performs QoS processing on the application-layer data channels, combines the plurality of QoS-processed application-layer data channels into a combined packet flow, and outputs the combined packet flow onto the communication session between the client device and the server.

In yet another embodiment, a computer-readable medium comprises instructions for causing a programmable processor to intercept, with an intermediate device, a packet flow associated with a communication session between a client device and a server, and split, with the intermediate device, the intercepted packet flow of the communication session into a plurality of application-layer data channels, wherein each application-layer data channel represents an independent stream of application-layer data within the communication session. The computer-readable medium further comprises instructions for causing a programmable processor to perform QoS processing on the application-layer data channels within the intermediate device, combine, with the intermediate device, the plurality of QoS-processed application-layer data channels into a combined packet flow; and output the combined packet flow from the intermediate device onto the communication session between the client device and the server.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
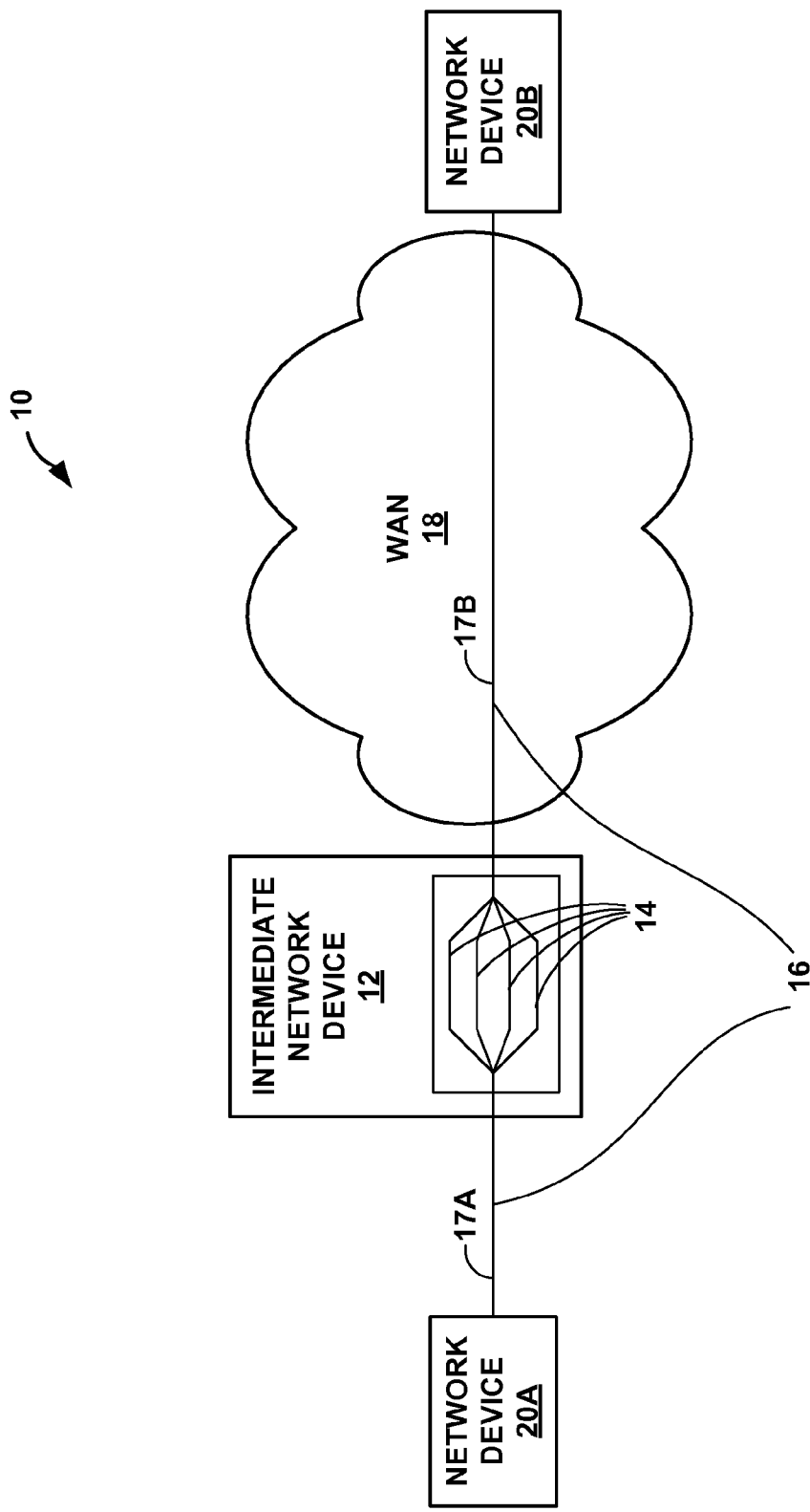
FIG. 1 is a block diagram illustrating an exemplary network system in which an intermediate network device performs Quality of Service (QoS) processing upon individual channels within a single communication session between network devices.

FIG. 1 is a block diagram illustrating an exemplary network system 10 in which an intermediate (IM) network device 12 performs Quality of Service (QoS) processing upon individual channels 14 within a single communication session 16 across a Wide Area Network (WAN) 18 between a network device 20A and a network device 20B ("network devices 20"). For example, communication session 16 may be a Transmission Control Protocol (TCP) session. Although the techniques are described herein in reference to TCP communications for exemplary purposes, they may readily be applied to other network communication protocols. Network device 20A may be a client network device, while network device 20B may be a server network device. Network device 20A may be any client-side computing device used by an individual end user, and may be located within a remote office of an enterprise or other location. Network device 20B represents any resource with which network device 20A establishes a communication session, such as TCP session 16. For example, network devices 20 may comprise personal computers, laptops, workstations, personal-digital assistants (PDAs), wireless devices, network-ready appliances, file servers, print servers, routers, or other devices. Network devices 20 exchange communications using TCP session 16, which typically includes two streams of TCP packets flowing in opposite directions between the network devices.

Network devices 20 may communicate using an application protocol that employs a plurality of channels for different functions. For example, network devices 20 may use an application protocol such as the Microsoft™ Remote Desktop Protocol, which utilizes different "data channels" for communicating application-layer data for operations such as user-interface-related operations (e.g., key presses, mouse movement, display updates, clipboard transfers, audio), file access operations (e.g., print jobs, file transfers, file read/write), and other functions. As other example, the application protocol may be a video conferencing protocol that uses different data channels for communicating application-layer data for operations such as video, audio, instant messaging, whiteboard, and shared applications. As further examples, the application protocol may be the Secure Shell (SSH) protocol, the Blocks Extensible Exchange Protocol (BEEP) protocol, or a database protocol. The application protocol invokes the TCP protocol to establish TCP session 16 between network devices 20A and 20B, and sends the application-layer data as a combined plurality of channels on TCP session 16. Similarly, network device 20B may use the application protocol to send a combined plurality of channels to network device 20A via TCP session 16.

There are several reasons an application may be designed use a single TCP session to send multiple channels, as opposed to sending each channel over a separate TCP session. This configuration may be simpler because the channels are all connected to a single server, which avoids the situation in which a load balancer routes the individual channels to different servers. This configuration also avoids the situation where one of the multiple TCP sessions gets broken. This configuration may be more secure because only one TCP session needs to be authenticated and securely managed. As a result, network devices 20 need not determine whether a second TCP session belongs to the same user as a first TCP session.

In accordance with the principles of the invention, IM network device 12 is configured to transparently intercept a packet flow 17A associated with TCP session 16 and divide the packet flow 17A into its constituent application-layer data channels 14. In this process, IM device 12 may snoop or inspect the payloads of the intercepted packets so as to classify the packet with respect to application-layer operations. That is, IM device 12 is configured so as to be application-layer aware for certain protocols of interest, such as Microsoft™ Remote Desktop Protocol, so as to be able to determine whether the packets relate to certain application-layer operations. Based on the classification, IM device 12 splits the intercepted packet flow into constituent application-layer data channels 14. In one embodiment, data channels 14 represent the categorized packets without modification. Alternatively, IM device 12 may process the data channels 14 to reassemble the independent, application-layer data associated with the different application-layer operations.

In either case, IM network device 12 is further configured to apply QoS processing at the application layer to each of the channels 14. IM network device 12 may alter the contents of the packet flow 17A during the QoS processing, such as by reordering or dropping packets. As one example, assuming communication session 16 is associated with a remote terminal server software application executing on network devices 20, IM device 12 may identify a first channel 14 that carries application-layer data associated with file operations, such as print jobs or file accesses issued by the network device 20A. IM device 12 may also identify a second data channel that carries application-layer data associated with user interface related operations, such as key stokes, mouse movements, or display updates at network device 20A. IM device 12 may then apply QoS processing, such as reordering the application data with the intermediate device so that the second application data (i.e., the user interface related operations in this example) is earlier in the communication session relative to the first application data (i.e., the file operations). IM device 12 may reorder entire blocks of reassembled application-layer data, or may simply reorder the intercepted packets of session 16 based on the identified application-layer data carried by data channels 14. IM network device 12 recombines the channels, repacketizing the application-layer data if necessary, and outputs a modified packet flow 17B to network device 20B via TCP session 16.

Network devices 20 may also apply QoS processing to TCP session 16. However, network devices 20 may not have a sufficient view of network system 10 as a whole, and do not know what policies are in place, how much bandwidth has been guaranteed, and how much other traffic is present in the network. Moreover, conventional QoS implementations apply QoS across multiple TCP sessions (such as by providing priority to one session over another), but do not reorder the contents of a single TCP session or modify the data within the TCP session. As a result, the QoS provided by network devices 20 may be inadequate, particularly if several hops exist between the network devices 20. In contrast, IM network device 12 is aware of the conditions of network system 10, and IM network device 12 applies the techniques of the invention to reduce latency and jitter in communications between network devices 20 to provide an improved overall user experience. IM network device 12 may also provide additional transparent processing of TCP sessions, such as acceleration or intrusion detection.

In one embodiment, IM network device 12 is a network acceleration device. In other embodiments, the techniques described herein are incorporated within a proxy server, load balancer, router, gateway, intelligent switch, intelligent hub, or other type of intermediate network device. An administrator may configure IM network device 12 to enable IM network device 12 to split TCP session 16 into its constituent channels 14 and apply QoS processing to the channels for a particular protocol of interest. This may include, for example, installing an application-layer plug-in software module for each protocol of interest so as to provide the application-layer intelligence necessary to categorize the intercepted packets and optionally reassemble the application-layer data conveyed by the packets. IM network device 12 may be transparent to both network device 20A and network device 20B. In another embodiment, IM network device 12 may operate in a full proxy mode between network devices 20 so as to maintain separate communication sessions with the devices. In some embodiments, network system 10 may include multiple IM devices 12 that operate at different locations within network system 10.

WAN 18 may be a public or a private network. For instance, WAN 18 may form part of the Internet. Moreover, connections within network system 10 may be wired or wireless and may consist of any network communication medium. The techniques are described herein in reference to TCP communications for exemplary purposes, and may readily be applied to other network communication protocols. Similarly, although described in terms of a Remote Desktop Protocol, the principles of the invention may be used for other protocols having multiple channels combined within a single communication session. Moreover, the term "flow" is used herein to refer to the packets associated with the same communication session, e.g., a TCP session, and a single flow may include packets communicated from both the source to the destination and the destination to the source.

Figure 2:
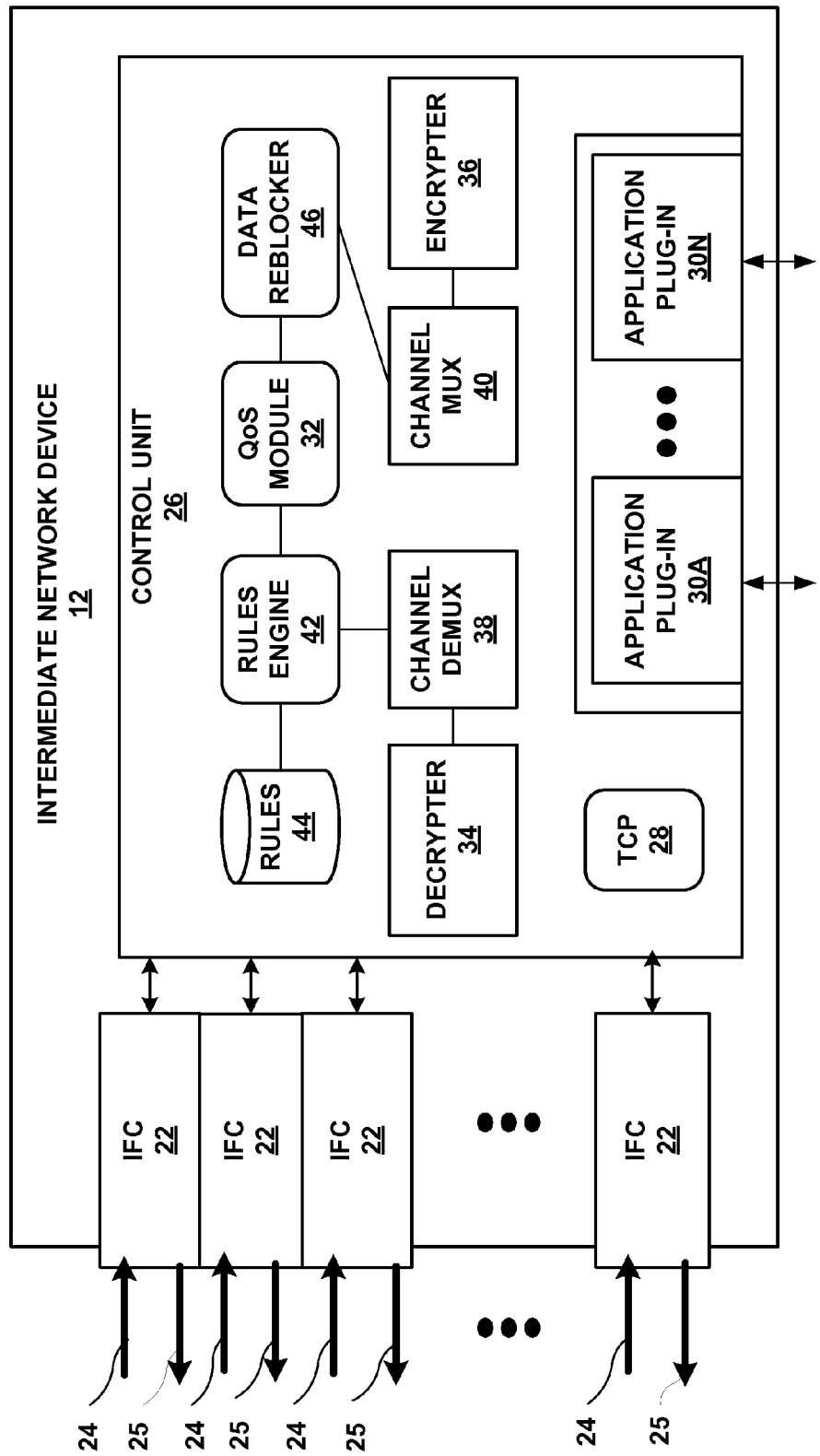
FIG. 2 is a block diagram illustrating an exemplary intermediate network device capable of performing QoS processing upon individual channels within the single communication session in accordance with the techniques described herein.

FIG. 2 is a block diagram illustrating an exemplary IM network device 12, described above with respect to FIG. 1, in further detail. In general, IM network device 12 is capable of interacting with network devices 20 to facilitate transmission of data through WAN 18. In particular, IM network device 12 is capable of performing QoS processing on individual channels within a single packet flow received via a communication session, such as a TCP session. IM network device 12 may be a network accelerator, proxy server, load balancer, router, gateway, intelligent switch, intelligent hub, or other type of intermediate network device.

In the illustrated embodiment, IM network device 12 includes interface cards (IFCs) 22 that receive packets on inbound links 24 send packets on outbound links 25. IFCs 22 are coupled to inbound links 24 and outbound links 25 via a number of interface ports (not shown). IM network device 12 also includes control unit 26 that provides an operating environment for network communication protocols such as TCP protocol 28. In other embodiments, other network communication protocols may be executed within control unit 26. IM network device 12 may use TCP protocol 28 to intercept and/or establish TCP sessions, such as TCP session 16 (FIG. 1). IM network device 12 sends and receives packet flows using TCP protocol 28.

In the illustrated embodiment, control unit 26 includes application-specific plug-ins 30A-30N ("application plug-ins 30"). Each of plug-ins 30 corresponds to a different network application for which IM device 12 is configured to snoop communications and transparently provide QoS services. As one example, application plug-in 30A may be a plug-in for Citrix Systems™ Independent Computing Architecture (ICA) protocol. The application-layer plug-ins may additionally be version-specific, i.e., control unit 26 may include a separate protocol plug-in for different versions of a protocol. The application plug-ins 30 may contain protocol-specific information used by channel demultiplexer 38, by rules engine 42 for performing dependency analysis, and by QoS module 32 in performing QoS processing for respective protocols, as described in detail below. IM network device 12 may determine which of application plug-ins 30 to access based on information contained in the packets of the received packet flows.

For example, application plug-ins 30 may contain application-specific information and software routines based on the particular format, timing requirements, error handling, messaging sequence and other requirements of a particular network application. As another example, application plug-ins 30 may contain information regarding specific fields or data types within packets that indicate a priority level of application-layer data conveyed by the packets. For instance, the application plug-ins may contain information necessary to identify priority bits and a byte count of an ICA framing header, and handle the packet accordingly. The application plug-ins 30 may be installed within control unit 26 as one or more dynamically linked libraries (DLLs) or other mechanism.

Control unit 26 may also include a decrypter 34 to de-encrypt intercepted packet flows that have been encrypted, and a encrypter 36 to re-encrypt the processed packet flows for outputting back into the network via the communication session. Control unit 26 further includes a channel demultiplexer 38 ("Channel DEMUX 38") to demultiplex an intercepted packet flow into its constituent channels for processing. In this process, channel demultiplexer 38 may snoop or inspect the application-layer data within the payloads of the intercepted packets so as to classify each packet with respect to application-layer operations. Channel demultiplexer 38 may invoke application plug-ins 30 during this process to determine whether the intercepted packets contain recognized application-layer data and, if so, to classify the packets. Based on the classification, channel demultiplexer 38 splits the intercepted packet flow into constituent application-layer data channels. In one embodiment, channel demultiplexer 38 further processes the data channels so as to reassemble the independent, application-layer data associated with the different application-layer operations.

Rules engine 42 performs dependency analysis among packets associated with the various channels based on the application-layer operations described in the packets. Rules engine 42 may invoke application plug-ins 30 as necessary to obtain protocol-specific information for performing the dependency analysis. Rules engine 42 may perform dependency analysis by applying rules stored in rules data structure 44. As one example, a rule may require that when a packet(s) carrying application-layer data associated with a mouse movement is followed by a packet(s) carrying application-layer data associated with a keystroke, rules engine 42 must maintain the packets associated with the mouse movement and the keystroke in the same order, since the mouse movement may affect where the typing is directed. As another example, a rule may dictate that rules engine 42 deliver sound ±2 seconds from when the sound otherwise would have arrived. This may prevent a sound associated with another operation from being delivered much later than the operation, which could result in user confusion.

As yet another example, a rule may dictate that rules engine 42 reorder packets associated with certain application-layer operations, for example, reordering packets associated with display updates to place the packets before packets associated with print jobs within the communication so that display updates occur prior to the print job being executed. Moreover, in accordance with rules 44, rules engine 42 may determine that IM network device 12 should drop packets if network conditions will not allow for timely delivery, such as by discarding redundant mouse movements. Similarly, rules engine 42 may determine that IM network device 12 should replace some audio data with silence to avoid jitter. Control unit 26 may maintain rules data structure 44 in the form of one or more tables, databases, link lists, radix trees, databases, flat files, or any other data structures.

QoS module 32 performs typical Quality of Service processing on each of the individual channels, within the constraints identified by rules engine 42. For example, QoS module may check priority bits within the packets to determine a priority level of each packet. QoS module 32 may re-arrange the contents of the data within the channels according to the QoS processing, such as by putting high priority packets ahead of low priority packets. If the protocol applies any form of window sizes, QoS module 32 may use this feature to control the flow rate of the channels. The QoS processing may be significantly more effective when applied on a per-channel basis than when applied to the TCP stream as a whole. In some situations, applying QoS processing alone to the individual channels may worsen the user experience; however, IM network device 12 prevents such problems by applying both dependency analysis and QoS processing to each channel.

QoS module 32 may employ measures to prevent "priority inversion," in which dependency of a higher priority operation upon a lower priority operation causes execution of the higher priority operation to be delayed until the lower priority operation has been handled. Priority inversion may occur since data within the different channels is marked with different priority levels. As one example, QoS module 32 may employ "priority elevation," which boosts the priority level of the lower priority operation to match the priority level of the higher priority operation. QoS module 32 may access application plug-ins 30 as necessary to obtain protocol-specific information for performing QoS processing on the channels.

Control unit 26 also includes data reblocker 46, which may reblock the application-layer data within each channel. For example, data reblocker 46 may consolidate data packets to reduce the proportion of header data to payload. As another example, data reblocker 46 may divide large packets into multiple smaller data packets. This may be done for print data, since it may be undesirable to have a large chunk of print data blocking a transmission line for an extended time. After control unit 26 is finished processing the channels, channel multiplexer 40 recombines the channels back into a single packet flow to be output onto a TCP session. In some embodiments, QoS module 32 may apply QoS processing to the outgoing TCP session, as well as to each channel within the TCP session. While the dependency analysis, QoS processing, and data reblocking are respectively performed by rules engine 42, QoS module 32, and data reblocker 46 at the application layer of the network stack, control unit 26 maintains TCP sequence numbers at the transport layer for the intercepted session.

Channel multiplexer 40 ("channel MUX 40") multiplexes the processed data channels into a packet flow for outputting back into the network. That is, after QoS processing, channel multiplexer 40 multiplexes the packets associated with the different application-layer operations to inject the multiplexed packets back into the intercepted communication session.

Figure 3:
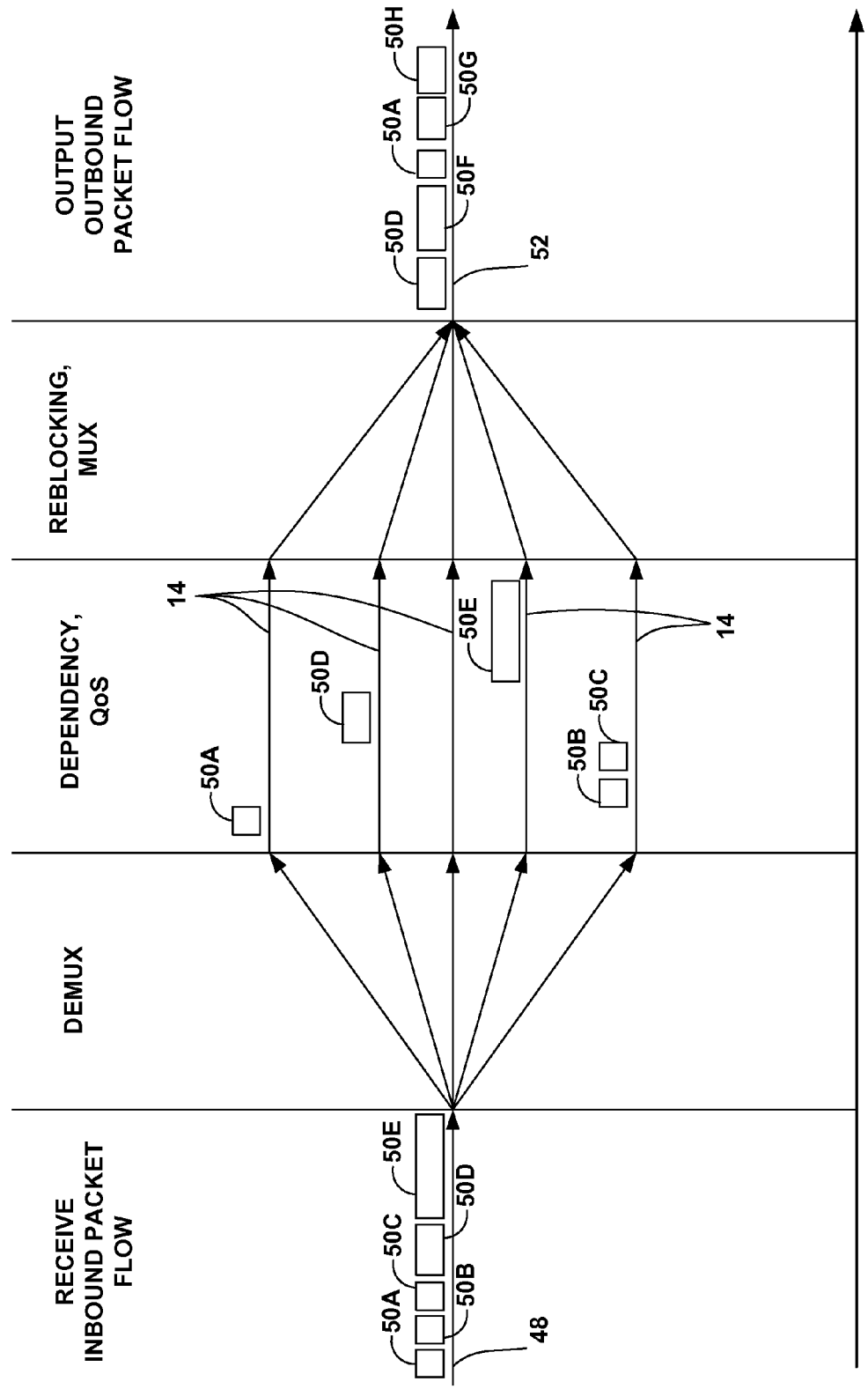
FIG. 3 is a timing diagram illustrating example operation of the intermediate network device in splitting a communication session into individual channels and performing QoS processing upon the individual channels.

FIG. 3 is a timing diagram illustrating example operation of the IM network device 12 in splitting a packet flow received via a TCP session into individual channels 14 and performing dependency analysis, QoS processing, and reblocking on the individual channels. IM network device 12 intercepts an inbound packet flow 48 associated with communication session 16 from network device 20A (FIG. 1). Inbound packet flow 48 may consist of packets 50A-50E. As shown, packets 50A-50E may be of differing lengths. If necessary, decrypter 34 de-encrypts packet flow 48.

IM network device 12 uses channel demultiplexer 38 to demultiplex packet flow 48 into its constituent channels 14, either by snooping on the application-layer data carried by the packet payloads or by reassembling the application-layer data. IM network device 12 then applies analysis and processing on a per- and inter-channel basis. In the example shown, assume packet 50A contains application-layer data related to a display update, and packet 50D contains application-layer data related to a sound associated with the display update. By referring to rules data structure 44, rules engine 42 may perform dependency analysis to determine that packet 50A and packet 50D must remain within a certain distance of one another, although their order may be reversed. For example, rules engine 42 may maintain at least a minimum number of intermediate packets between packet 50A and packet 50D in the outbound packet flow 52 based on the dependency analysis. QoS module 50 applies QoS processing to each individual channel 14.

Data reblocker 46 may reblock the data, and channel multiplexer 40 multiplexes the channels 14 together into a single packet flow 52, which IM network device 12 outputs onto communication session 16. As shown, packet 50E is large, and packets 50B, 50C are small. In this example, data reblocker 46 combines packets 50B, 50C into a single larger packet 50F, thereby decreasing the amount of header data required to send the data within original packets 50B, 50C. Data reblocker 46 also splits packet 50E into two smaller packets 50G, 50H, so that one large packet will not tie up the network link for a longer time. IM network device 12 may update a database or other structure so as to accurately track and mimic TCP sequence numbers and other information related to the intercepted session. If necessary, encrypter 36 re-encrypts the packet flow 52, and IM network device 12 sends packet flow 52 out to network device 20B onto communication session 16.

Figure 4:
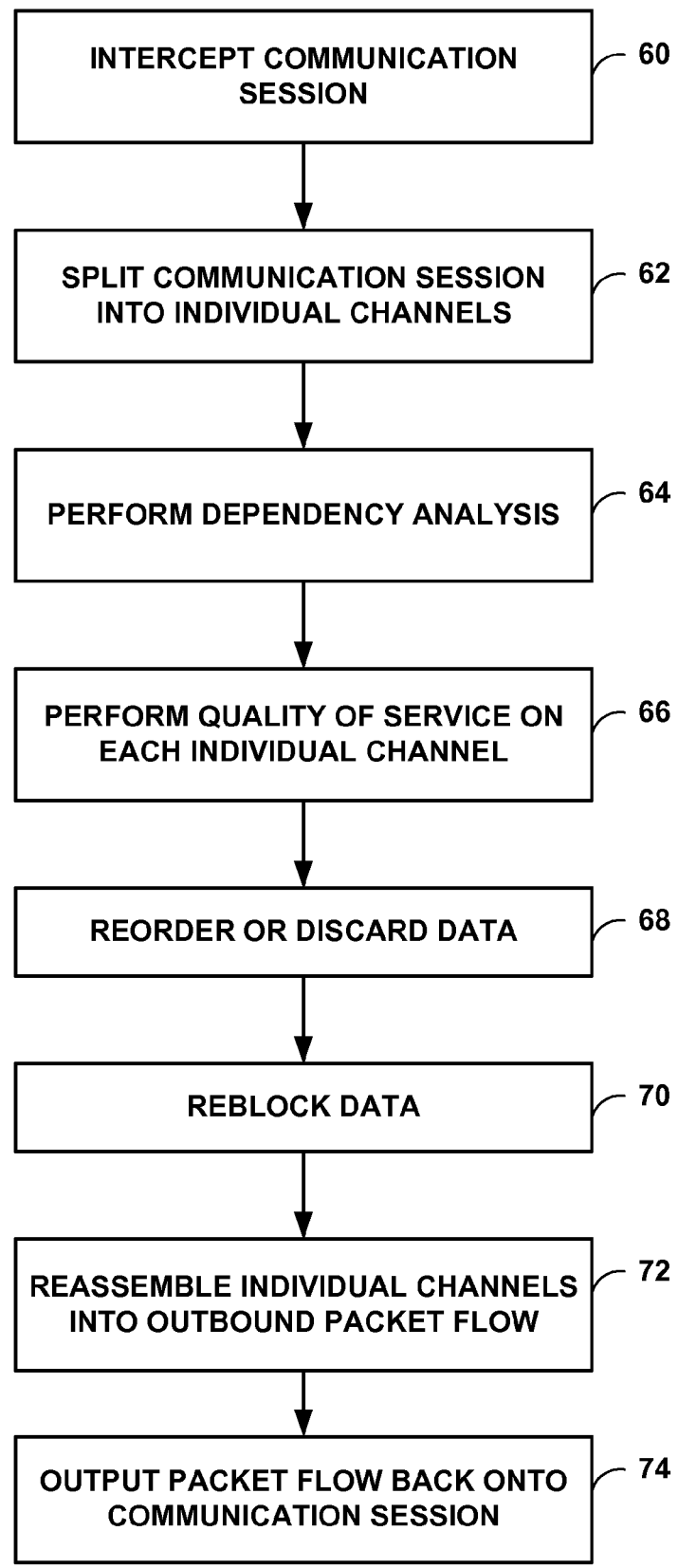
FIG. 4 is a flowchart illustrating example operation of the intermediate network device performing QoS processing upon individual channels of a single communication session.

FIG. 4 is a flowchart illustrating example operation of IM network device 12 performing QoS processing to individual channels of a single communication session. IM network device 12 intercepts a communication session via one of inbound links 24 of an IFC 22 (60). If the packet flow associated with the session is encrypted, decrypter 34 de-encrypts the packet flow. When the communication session is composed of a plurality of channels, channel demultiplexer 34 invokes application plug-ins 30 to analyze the application-layer data for the intercepted packets and assist in demultiplexing the communication session into its constituent application-layer data channels (62).

Rules engine 42 performs dependency analysis among the channels in accordance with rules 44 to determine if any dependencies exist between packets across different channels (64). Rules engine 42 accesses application plug-ins 30 as necessary to perform the dependency analysis, such as by retrieving application-specific rules specified within the plug-ins. QoS module 32 performs QoS processing to each of the individual channels (66), similarly accessing application plug-ins 30 as necessary. Additionally, if rules engine 42 or QoS module 32 determines that packets should be dropped or reordered, control unit 12 drops or reorders the packets accordingly (68).

Data reblocker 46 may reblock the data within the channels, such as by combining smaller packets into single larger packets or splitting packets up, as described above (70). Channel multiplexer 40 reassembles the processed individual channels into a single outbound packet flow (72). IM network device 12 outputs the packet flow back onto the communication session via one of outbound links 25 of an IFC 22 (74).

Figure 5:
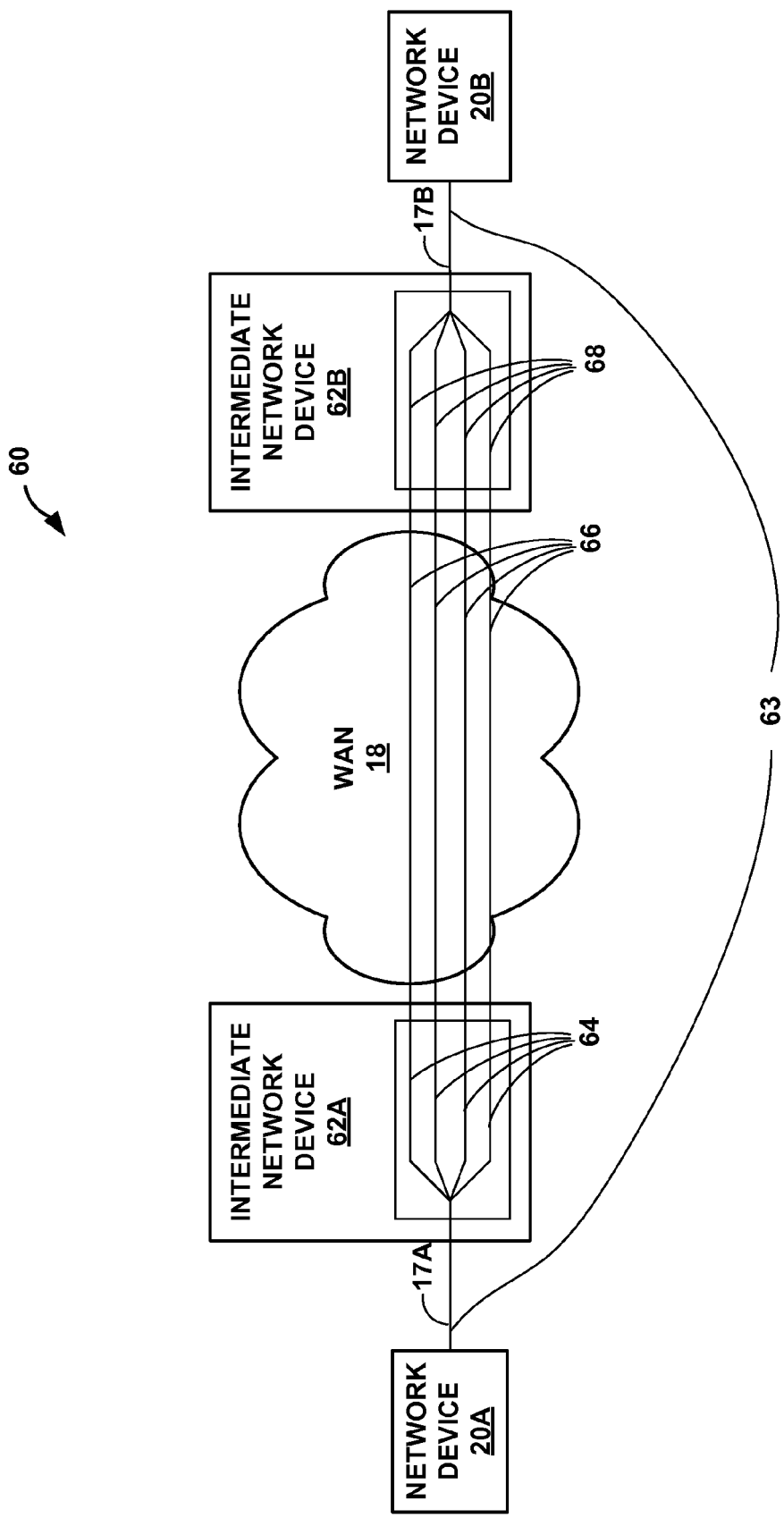
FIG. 5 is a block diagram illustrating an exemplary network system in which two intermediate network devices perform QoS processing upon individual channels within a single communication session at either end of a Wide Area Network (WAN).

FIG. 5 is a block diagram illustrating an exemplary network system 60 in which two intermediate network devices 62A and 62B ("IM network devices 62") perform Quality of Service (QoS) processing upon individual channels within a communication session 63 at either end of a WAN 18. In some embodiments, each of IM network devices 62 may operate substantially similarly to IM network device 12, described above. In other embodiments, IM network devices 62 may perform certain functions in common with IM network device 12, but not others. However, instead of recombining channels 64 into a single communication session 63 after IM network device 62A performs dependency analysis, QoS processing, and data reblocking upon each of channels 64, IM network device 62A outputs each of the channels 64 using separate communication sessions 66.

IM network device 62B is located across WAN 18 from IM network device 62A, and receives the packet flows associated with the separate communication sessions 66 from IM network device 62A. IM network device 62B also performs dependency analysis, QoS processing, and data reblocking upon each of the channels 68 associated with the communication sessions 66. IM network device 62B then combines the processed application-layer channels 68 into a single outbound communication stream, and outputs the communication stream on single communication connection 16B so that both IM devices 62 are transparent to network devices 20. In some embodiments, communication session 63 may be a TCP session. IM network devices 62 may also intercept packets flowing in the opposite direction from network device 20B to network device 20. In this case, IM network devices 62 may be substantially similar to IM network device 12 as illustrated in FIG. 2.

In other embodiments, IM network devices 62 may include only one of channel demultiplexer 38 and channel multiplexer 40, depending on whether the IM network device 62 receives or outputs a single communication session containing multiple channels. Although not illustrated, network system 10 may include other intermediate devices that perform QoS actions to communication sessions 66.

Various embodiments of the invention have been described. These and other embodiments are within the scope of the following claims.

The invention claimed is:

1. A method comprising:
   intercepting, with an intermediate device, a packet flow associated with a communication session between a client device and a server;
   splitting, with the intermediate device, the intercepted packet flow of the communication session into a plurality of application-layer data channels, wherein each application-layer data channel represents an independent stream of application-layer data within the communication session;
   assembling separate application data for each of the application-layer data channels of the communication session;
   performing Quality of Service (QoS) processing on the assembled application data of the application-layer data channels within the intermediate device;
   combining, with the intermediate device, the plurality of QoS-processed application-layer data channels into a combined packet flow; and
   outputting the combined packet flow from the intermediate device onto the communication session between the client device and the server.

2. The method of claim 1, wherein splitting the intercepted packet flow comprises snooping payloads of packets within the intercepted packet flow to classify each of the packets with respect to application-layer operations.

3. The method of claim 1,
   wherein assembling the separate application data comprises:
      assembling first application data for file-related operations; and
      assembling second application data for user interface-related operations, wherein performing QoS processing comprises reordering the application data with the intermediate device such that the second application data is earlier in the communication session relative to the first application data.

4. The method of claim 3,
wherein the communication session is associated with a remote terminal server software application executing on the client device,
wherein the file-related operations of the first application data for the communication session are print jobs or file accesses issued by the client device, and
wherein the user interface-related operations of the second application data for the communication session are key strokes, mouse movements, or display updates at the client device.

5. The method of claim 1, wherein performing QoS processing comprises performing dependency analysis upon the application-layer data of the data channels to determine any dependencies between the data channels.

6. The method of claim 5, further comprising reordering the packets associated with the application data based on the dependency analysis.

7. The method of claim 5, further comprising discarding a subset of the application data based on the dependency analysis.

8. The method of claim 5, further comprising maintaining at least a minimum number of intermediate packets within the combined packet flow between packets associated with a first one of the data channels and packets associated with a second one of the data channels based on the dependency analysis.

9. The method of claim 5, wherein performing dependency analysis further comprises retrieving application-specific rules specified by an application-specific plug-in within the intermediate device to determine the dependencies.

10. The method of claim 1, further comprising reblocking data packets associated with the data channels by combining one or more data packets to form fewer packets.

11. The method of claim 1, wherein performing QoS processing comprises analyzing packets associated with one of the data channels to determine a priority level associated with the application-layer data, and reordering the packets based on the priority level.

12. The method of claim 1, wherein splitting the intercepted packet flow comprises invoking one or more application-specific plug-ins within the intermediate device to analyze application-layer data conveyed by packets of the intercepted packet flow and classify each of the packets with respect to a set of application-layer operations described by the application-layer data.

13. The method of claim 1, wherein intercepting a communication session comprises intercepting a Transmission Control Protocol (TCP) session.

14. An intermediate device comprising:
an interface card for intercepting a packet flow associated with a communication session between a client device and a server;
a demultiplexer for splitting the intercepted packet flow of the communication session into a plurality of application-layer data channels, wherein each application-layer data channel represents an independent stream of application-layer data within the communication session, and wherein the demultiplexer assembles separate application data for each of the application-layer data channels of the communication session;
a Quality of Service (QoS) module for performing QoS processing on the assembled application data of the application-layer data channels;

a multiplexer for combining the plurality of QoS-processed application-layer data channels into a combined packet flow,
wherein the interface card outputs the combined packet flow onto the communication session between the client device and the server.

15. The intermediate device of claim 14, wherein the demultiplexer splits the intercepted packet flow by snooping payloads of packets within the intercepted packet flow to classify each of the packets with respect to application-layer operations.

16. The intermediate device of claim 14, further comprising a rules engine for performing dependency analysis upon the application-layer data of the data channels to determine any dependencies between the data channels.

17. The intermediate device of claim 16, wherein the intermediate device reorders the packets associated with the application data the data based on the dependency analysis.

18. The intermediate device of claim 16, wherein the intermediate device discards a subset of the application data based on the dependency analysis.

19. The intermediate device of claim 16, wherein the intermediate device maintains at least a minimum number of intermediate packets within the combined packet flow between packets associated with a first one of the data channels and packets associated with a second one of the data channels based on the dependency analysis.

20. The intermediate device of claim 16, wherein the rules engine performs dependency analysis prior to the QoS module performing QoS processing.

21. The intermediate device of claim 14, wherein the QoS module analyzes packets associated with one of the data channels to determine a priority level associated with the application-layer data, and reorders the packets based on the priority level.

22. The intermediate device of claim 14, further comprising a plurality of application-specific plug-ins, wherein the demultiplexer invokes one or more of the application-specific plug-ins to analyze application-layer data conveyed by packets of the intercepted packet flow and classify each of the packets with respect to a set of application-layer operations described by the application-layer data.

23. The intermediate device of claim 14, wherein the intermediate device comprises one of a network accelerator, a proxy server, a load balancer, a router, a gateway, an intelligent switch, and an intelligent hub.

24. The intermediate device of claim 14, wherein the interface card intercepts a Transmission Control Protocol (TCP) session that includes the plurality of data channels.

25. A system comprising:
a wide area network (WAN);
a client device that exchanges network communications with a server across the WAN via a communication session; and
an intermediate network device that intercepts a packet flow associated with the communication session, splits the intercepted packet flow of the communication session into a plurality of application-layer data channels, wherein each application-layer data channel represents an independent stream of application-layer data within the communication session, assembles separate application data for each of the application-layer data channels of the communication session, performs Quality of Service (QoS) processing on the assembled application data of the application-layer data channels, combines the plurality of QoS-processed application-layer data channels into a combined packet flow, and outputs the combined packet flow onto the communication session between the client device and the server.

26. A non-transitory computer-readable medium comprising instructions for causing a programmable processor to:
- intercept, with an intermediate device, a packet flow associated with a communication session between a client device and a server;
- split, with the intermediate device, the intercepted packet flow of the communication session into a plurality of application-layer data channels, wherein each application-layer data channel represents an independent stream of application-layer data within the communication session;
- assemble separate application data for each of the application-layer data channels of the communication session;
- perform Quality of Service (QoS) processing on the assembled application data of the application-layer data channels within the intermediate device;
- combine, with the intermediate device, the plurality of QoS-processed application-layer data channels into a combined packet flow; and
- output the combined packet flow from the intermediate device onto the communication session between the client device and the server.

* * * * *